United States Patent
Vasudevan et al.

(10) Patent No.: US 7,925,261 B2
(45) Date of Patent: Apr. 12, 2011

(54) METHODS AND APPARATUS FOR RESOVLING FREQUENCY ERRORS DURING TRANSISTION BETWEEN COMMUNICATION NETWORKS

(75) Inventors: Srinivasan Vasudevan, San Diego, CA (US); Arunava Chaudhuri, San Diego, CA (US); Mohit Narang, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 714 days.

(21) Appl. No.: 11/948,246

(22) Filed: Nov. 30, 2007

(65) Prior Publication Data

US 2009/0141837 A1 Jun. 4, 2009

(51) Int. Cl.
*H04W 4/00* (2009.01)
(52) U.S. Cl. .......................... 455/434; 375/340
(58) Field of Classification Search .......... 375/340, 375/330; 455/435
See application file for complete search history.

(56) References Cited

U.S. PATENT DOCUMENTS

| 2006/0251190 A1* | 11/2006 | Wang et al. ............ 375/330 |
| 2008/0194256 A1* | 8/2008 | Tran et al. ............ 455/434 |

* cited by examiner

*Primary Examiner* — David C. Payne
*Assistant Examiner* — Tanmay K Shah
(74) *Attorney, Agent, or Firm* — Kam T. Tam; Darren M. Simon

(57) ABSTRACT

Methods and apparatus for resolving frequency errors in a wireless device transitioning from a first communication network to a second communication network are disclosed. The methods and apparatus effect reception of a first and second channels from the second communication network where the first channel has known characteristics. The first channel is then decoding for a prescribed period and an initial frequency error value is determined based on the decoding of the first channel. A digital frequency rotator is then adjusted based on the initial frequency error value for purposes of decoding the second channel. The second channel is then decoded using the digital frequency rotator as adjusted based on the initial frequency error value, without further calculation of the frequency error.

20 Claims, 4 Drawing Sheets

METHODS AND APPARATUS FOR RESOVLING FREQUENCY ERRORS DURING TRANSISTION BETWEEN COMMUNICATION NETWORKS

BACKGROUND

1. Field

The present disclosure relates to methods and apparatus for resolving frequency errors during transition between communication networks, and more particularly to resolving frequency errors in a mobile terminal when transitioning from one communication network to another communication network.

2. Background

In communication systems, mobile terminals sometimes have to transition or "handover" between networks employing different radio access technologies based on coverage and network settings. For instance, if a device operating within a third generation (3G) network, such as a Universal Mobile Telecommunications System (UMTS) network, lacks or is losing coverage, the mobile terminal may have need to transition from the 3G network to another radio access technology, such as a network other than a 3G network (e.g., a Global System for Mobile communication (GSM) network). When transitioning, a mobile device typically may obtain information concerning at least a couple of characteristics of the network to which the mobile is transitioning. In particular, the two determined characteristics are the power level and the timing of the network to which the mobile terminal is transitioning.

In some communication systems, determining the timing is a two-step process. In the case of a transition from a wideband code division multiple access (W-CDMA, which is used in UMTS) to a GSM network, a mobile terminal first decodes a channel having known information, such as a Frequency Correction Channel (FCCH). The Frequency Correction Channel (FCCH) is used in GSM systems, in particular, to transmit a frequency correction data burst of all "zeros" (i.e., the known information). The resulting frequency shift seen by the mobile terminal may then used for frequency correction.

After decoding the first channel, a second channel, such as a synchronization channel (SCH), is decoded based on the decoded information from the first channel for purposes of decoding the transmitted payload or data. In GSM, for example, the Synchronization Channel (SCH) is a downlink only channel that is broadcast periodically to help mobile terminals identify the base station information code (BSIC) and the time division multiple access (TDMA) frame number.

Frequency error, however, can arise when transitioning from one network to another due to factors such as Doppler effect, arising due to the speed of the mobile terminal, and the difference in the local oscillator clock between the different network base stations (e.g., Frequency error=Doppler frequency+clock synchronization between UMTS and GSM systems). Performance of SCH decoding, in particular, is affected by the frequency error. Typically, the performance degrades for frequency errors greater than 300 Hz, resulting in SCH decode failures. Without decoding the SCH, the mobile terminal does not have the BSIC information to uniquely identify the GSM cell. Considering that the inter-network handover is triggered only when the coverage of the first network is weak, this will result in out of service or poor call performance.

Accordingly, in order to improve the SCH decoding performance, known mobile terminals employ frequency correction techniques. These techniques may involve the use of digitally controlled crystal oscillators (DCXOs). DCXOs compensate for frequency errors using a combination of digital and analog circuitry. Frequency errors may be programmatically controlled using a control loop topology, as an example. This methodology, with further implementation by DCXOs, however, is complex and is power inefficient because the FCCH channel is decoded each time prior to decoding the SCH channel.

SUMMARY

According to an aspect, a method for resolving frequency errors in a wireless device transitioning from a first communication network to a second communication network is disclosed. The method includes receiving a first channel from the second communication network, the first channel having at least one known characteristic. After receiving the first channel, it is decoded for a prescribed period, and an initial frequency error value is determined based on the decoding of the first channel for the prescribed period. A digital frequency rotator used to decode a second channel received from the second communication network is adjusted by an amount based on the determined initial frequency error value, and the second channel is continuously decoded using the digital frequency rotator adjusted based on the initial frequency error value.

According to another aspect, a mobile device operable for communication in at least first and second communication networks is disclosed. The mobile device includes a transceiver configured to receive a first channel from the second communication network, the first channel having at least one known characteristic. The mobile device also includes a decoder configured to initially decode the first channel for a prescribed period, and a frequency error calculation unit configured to calculate an initial frequency error value based on the decoded first channel from the decoder. Finally, the mobile device includes a frequency rotator configured to receive the initial frequency error value calculated by the frequency error calculation unit and adjust the frequency of a second channel received by the transceiver by an amount based on the determined initial frequency error value for decoding of the second channel by the decoder.

According to still another aspect, an apparatus for resolving frequency errors in a wireless device transitioning from a first communication network to a second communication network is disclosed. The apparatus includes means for receiving a first channel from the second communication network, the first channel having at least one known characteristic. Additionally, the apparatus includes means for decoding the first channel for a prescribed period, means for determining an initial frequency error value based on the decoding of the first channel for the prescribed period, and means for adjusting a digital frequency rotator used to decode a second channel received from the second communication network by an amount based on the determined initial frequency error value. The apparatus further includes means for continuously decoding the second channel using the digital frequency rotator adjusted based on the initial frequency error value.

According to yet another aspect, a computer program product including a computer-readable medium is disclosed. The medium includes code for causing a computer to receive a first channel from a communication network, the first channel having at least one known characteristic. The medium also includes code for causing a computer to decode the first channel for a prescribed period, and code for causing a computer to determine an initial frequency error value based on the decoding of the first channel for the prescribed period. The medium still further includes code for causing a computer to adjust a digital frequency rotator used to decode a second channel received from a communication network by an amount based on the determined initial frequency error value, and code for causing a computer to continuously decode the second channel using the digital frequency rotator adjusted based on the initial frequency error value.

According to still one further aspect, a processor programmed to execute a method for resolving frequency errors in a wireless device transitioning from a first communication network to a second communication network is disclosed. The method executed includes decoding the first channel for a prescribed period, and determining an initial frequency error value based on the decoding of the first channel for the prescribed period. The method also includes adjusting a digital frequency rotator used to decode a second channel received from the second communication network by an amount based on the determined initial frequency error value, and continuously decoding the second channel using the digital frequency rotator adjusted based on the initial frequency error value.

DETAILED DESCRIPTION

In the following descriptions, the disclosed embodiments provide a simple and low power approach to resolve frequency errors in a mobile terminal, particularly when transitioning from a first communication network to a second communication network whose frequency is not synchronized with the first network. In particular, a mobile communication device is configured to decode a first channel of the second network to which it is transitioning. The first channel has known characteristics, such as an FCCH. The mobile device decodes the first channel before attempting to decode a second channel, such as an SCH, used to identify based station information and frame numbers. Based on the decoded first channel information, a frequency error value (called Freq_Err) may then be calculated from the first channel information. If the Freq_Err value crosses a predetermined threshold (called SCH_Thresh), a digital rotator within the mobile device is configured to adjust the frequency of the incoming signal by a same amount as the Freq_Err for all future second channel (SCH) decodes. Accordingly, after this time the mobile device does not perform any further decoding of the first channel as long as decoding of the second channel is successful. As mentioned in the background above, decoding of the second channel (e.g., SCH) is normally performed in each instance by first calculating the frequency error from the first channel (e.g., FCCH). Thus, by only calculating frequency error from the first channel (FCCH) once for all future second channel (SCH) decodes, the presently disclosed apparatus and methods reduce complexity and power consumption.

It is further noted that if decoding of the second channel fails, and a received signal strength is above a threshold (called RSSI_thresh, which indicates that the signal from a base station of the second network is of sufficient level for proper decoding of the received channels), the mobile terminal may be configured to repeat decoding the first channel to once again determine a Freq_Err value prior to decoding the second channel.

Figure 1:
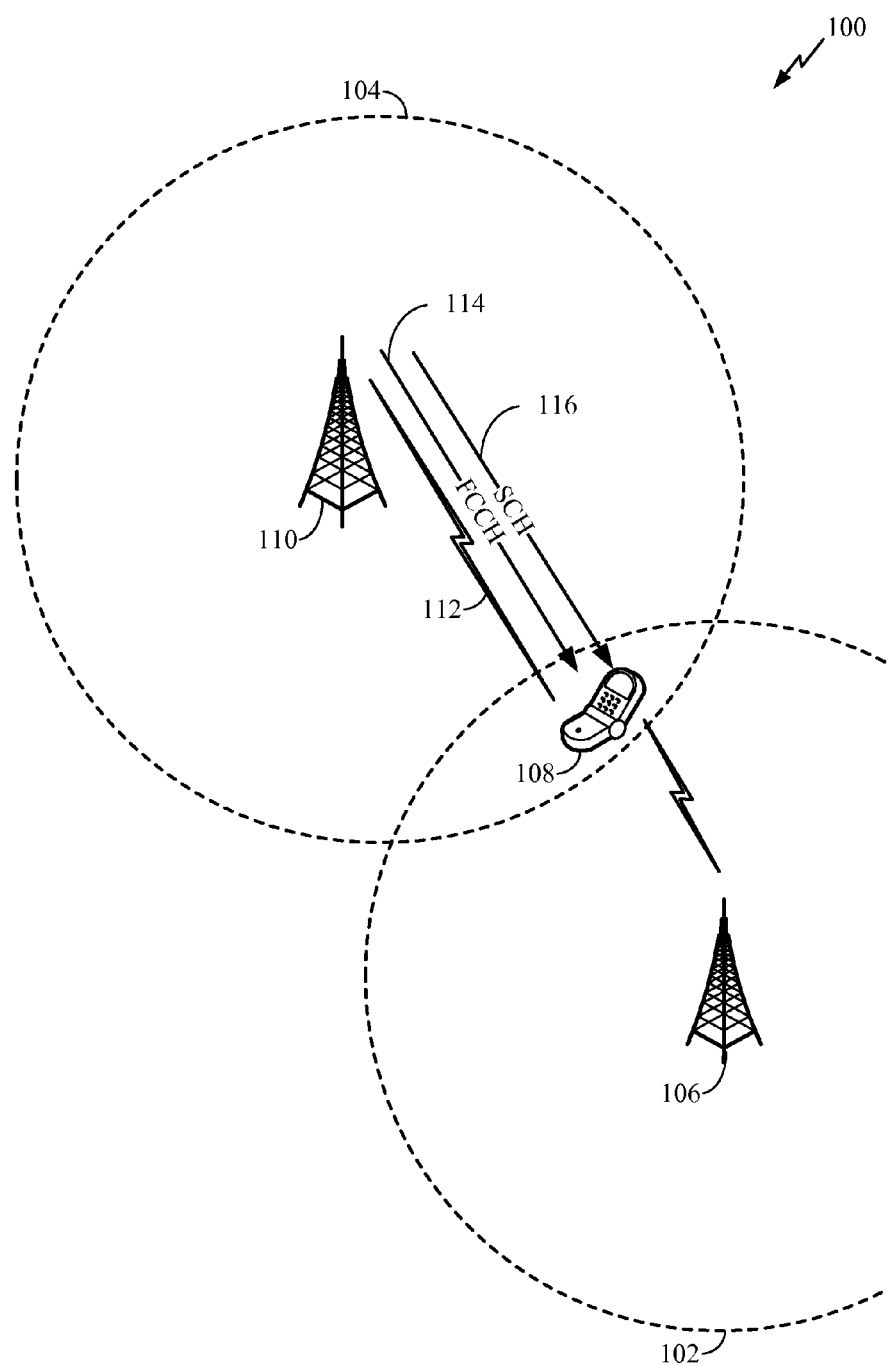
FIG. 1 illustrates a communication system having at least two different networks causing potential frequency errors for a mobile device transitioning between the at least two networks.

FIG. 1 illustrates a communication system 100 having at least two different networks 102 and 104. The first network 102 is effected by one or more base stations transceivers, such as base station transceiver 106, which communicate with mobile devices or terminals, such as mobile device 108. For purposes of illustration only, the communication system 100 may be configured with the first network 102 being a 3G network, such as a W-CDMA network. The second network 104 is effected also by one or more base station transceivers, such as base station transceiver 110, which communicates with mobile devices, such as mobile device 108. Again, for purposes of illustration, the second network 104 may be a network other than a 3G network, such as a GSM network.

The base station 110 in the second network 104 transmits downlink channels 112, including at least first and second broadcast channels 114 and 116, which are usable by mobile device 108 to obtain a frequency reference and system information, as examples. More specifically, the first broadcast channel 114 contains known information, which does not include data such as voice data, that can be utilized by the mobile device 108 in obtaining coarse timing and frequency information about the network 104 to which it is transitioning. In the example where the second network 104 is a GSM network, the first channel 114 may be an FCCH. The second broadcast channel may contain further synchronization information for fine timing, after the coarse timing derived from the first channel 114 is obtained. As an example, the second channel 116 may be the synchronization channel SCH, as illustrated in FIG. 1.

In the instance where the mobile device 108 moves away from coverage of the first network 102 to the second network 104, lack of coverage or network settings of the first network 102 may invoke a handover from the first network 102 to another network, if available, such as the second network 104. As discussed previously, if the first and second networks are different, frequency errors may result from the lack of synchronization between networks. Additionally, Doppler effects due to the mobile device speed may introduce further frequency error. Because of the frequency errors, decoding failures may occur resulting in dropped calls or pages.

Accordingly, a mobile terminal (e.g., 108) operating in system 100 may be configured to resolve frequency errors by first decoding the first channel 114 of the network to which it is transitioning (e.g., network 104) before decoding the second channel 116. Based on the decoding of the first channel, an initial frequency error may be calculated to be used to account for or resolve this error when decoding the second channel. In particular, a digital rotator may be employed to rotate or adjust the frequency for purposes of decoding the second channel. The second channel continues to be decoded based on the determined initial frequency error as long as decoding the second channel is successful. That is, the frequency error is determined once initially, and this value is continuously used until a failure of second channel decoding occurs.

It is noted that in the above example, the first network 102 is a 3G network and the second network 104 is a different network, such as a GSM network. It is noted, however, that the presently disclosed methods and apparatus may be also employable for any inter-network transition between two different radio access technologies where a lack of synchronization in timing will cause decoding failures. For example, it is conceivable that the presently disclosed methods and apparatus may be used in a mobile device transitioning from a 2G to a 3G system, or vice versa, or from one type of 2G technology to another, as long as a broadcast channel usable for frequency error correction is available in the network to which a mobile device is transitioning.

Figure 2:
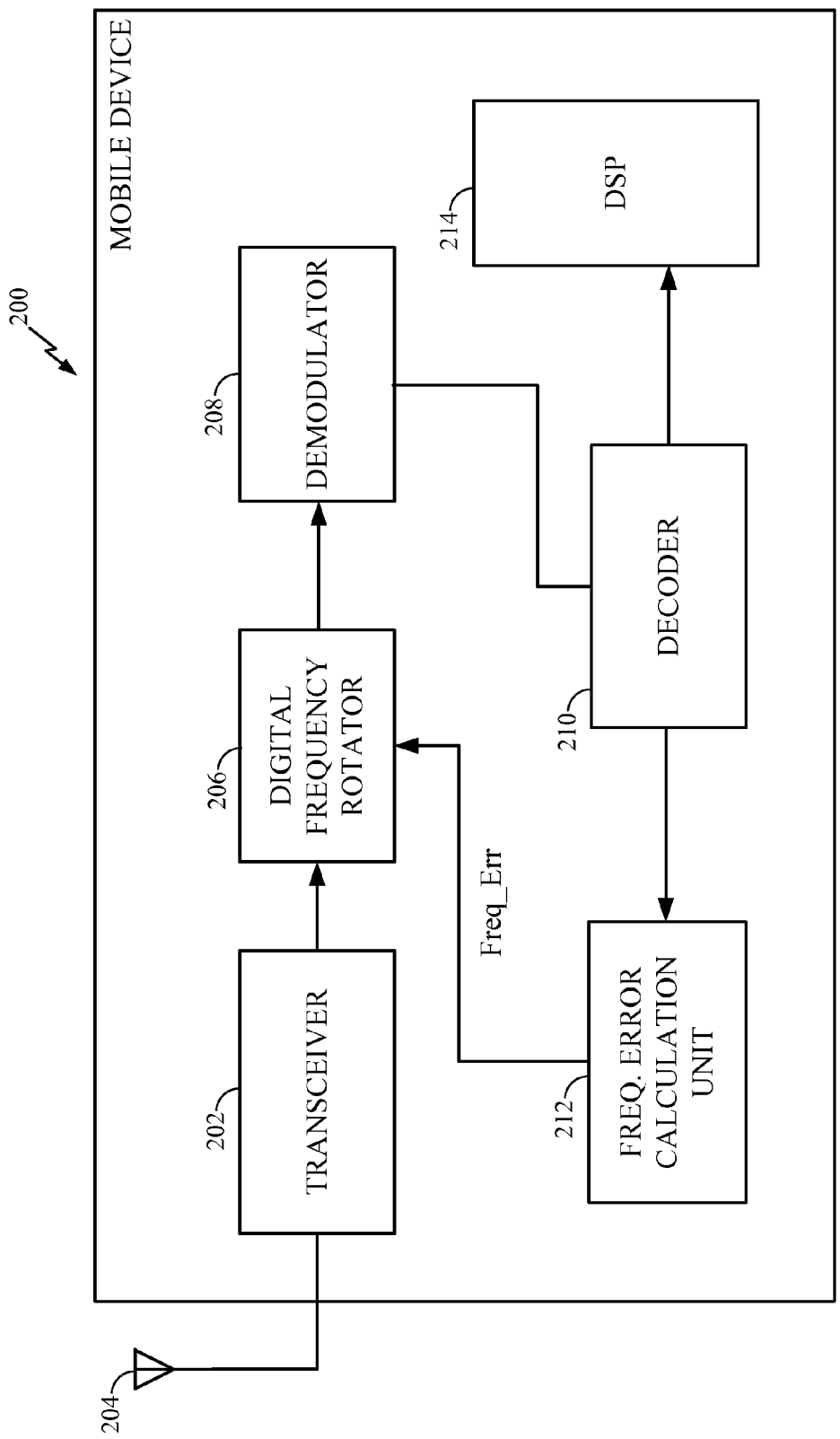
FIG. 2 illustrates an apparatus that is operable to resolve frequency errors arising when transitioning between two different networks.

FIG. 2 illustrates an exemplary mobile device 200 that may resolve frequency errors arising when transitioning between two different networks. Device 200 includes a transceiver 202 communicatively coupled with an antenna 204 for receiving and transmitting signals. In particular, transceiver 202 may be configured to transmit and receive signals from at least two different types of radio access technology. According to an aspect of the present disclosure, when the mobile device 200 transitions or making a determination whether to transition from a first network to a second network employing a different radio access technology from the first, transceiver 202 is configured to receive at least first and second broadcast channels from the second network.

Transceiver 202 outputs received channels to a digital frequency rotator 206, which adjusts or rotates the frequency for purposes of ensuring proper timing for decoding of the channels, as will be discussed in further detail later. The digital frequency rotator 206 outputs the frequency adjusted or rotated signals to a demodulator 208, which demodulates the signals according to any number of known modulation schemes that are employed by the transmitter of the received signals.

Demodulated signals are passed from demodulator 208 to a decoder 210, which decodes the signals, i.e., the first and second channels, according to any number of encoding schemes that may be employed by the transmitter of the signals. Decoder 210 is communicatively coupled to a frequency error calculation unit 212, and communicates at least the decoded first channel information to unit 212, which has been decoded for a prescribed time period. That is, the first channel received includes at least one known characteristic, such as timing information, which is usable for determining the frequency of the second communication network. Accordingly, in order to determine the frequency, which is periodic in nature, a temporal component (i.e., a prescribed time period) is involved to determine frequency. In the case of a GSM system, in particular, the first channel may be an FCCH channel having a known characteristic of a burst sequence of bits (zero bits not containing any data information), which is usable for determining frequency. It is noted that any similar channel for other various systems are usable with the present apparatus, as long as the known information transmitted over the channel is capable of affording frequency calculations.

Upon receiving the decoding first channel information, the frequency error calculation unit 212 calculates a frequency error value (Freq_Err) based on the first channel decoded information. In an example, unit 212 outputs an initial frequency error value to the digital frequency rotator 206 prior to decoding of the received second channel. The rotator 206, in turn, adjusts or rotates the frequency of the signal from the transceiver 202 by an amount based on the computed initial frequency error value. In an aspect, the frequency error value (Freq_Err) may represent the amount by which the rotator adjusts the frequency of the incoming signal. Once the rotator 206 has been set, the second channel received by the transceiver 202 is rotated by the frequency amount or offset of rotator 206 prior to demodulation and decoding by demodulator 208 and decoder 210, respectively. The decoded second channel, which may be a synchronization (SCH) channel in the case of GSM, is passed to a processor, such as digital signal processor (DSP) 214, for further processing and use by the mobile device 200. It is noted that the decoding of the second channel continues based on the initial frequency error value (i.e., without further calculation of the frequency error and frequency rotation), for as long as decoding of the second channel is successful.

According to another example, it is noted the frequency error calculation unit 212 may be further configured to determine if the initial frequency error value crosses a predetermined frequency error threshold prior to adjusting the digital frequency rotator. In this way, for frequency errors that are not significant enough to result in decoding errors for the second channel, the digital rotation is not triggered by the calculation unit 212 (i.e., the unit 212 does not issue the frequency error value (Freq_Err) to the digital frequency rotator 208 when the frequency error value has not crossed the predetermined frequency error threshold).

It is further noted according to yet another aspect, that a processor, such as DSP 214, may be configured to determine when a decoding failure of the second channel by the decoder 210 occurs. In such case, the frequency error value may not longer be accurate and needs to be recalculated for continued decoding of the second channel. Since a decoding failure could also occur due to lack of coverage or sufficient signal strength of the second communication network, the DSP may also be configured to determine the sufficiency of the received signal strength (e.g., as determined from a received signal strength indicator (RSSI)). One way to implement this functionality, is to determine when received signal strength of the second channel crosses a predetermined signal strength threshold to test the sufficiency of the signal strength. Accordingly, if the decoding of the second channel fails, yet the signal strength indicates coverage, either unit 212 or DSP 214 may initiate repeat decoding of the first channel by the decoder 210 for the prescribed period. After a repeated decoding of the first channel, unit 212 may then determine a subsequent frequency error value and output this value to rotator 206 to cause the rotator to rotate the frequency based on the subsequent frequency error value.

Figure 3:
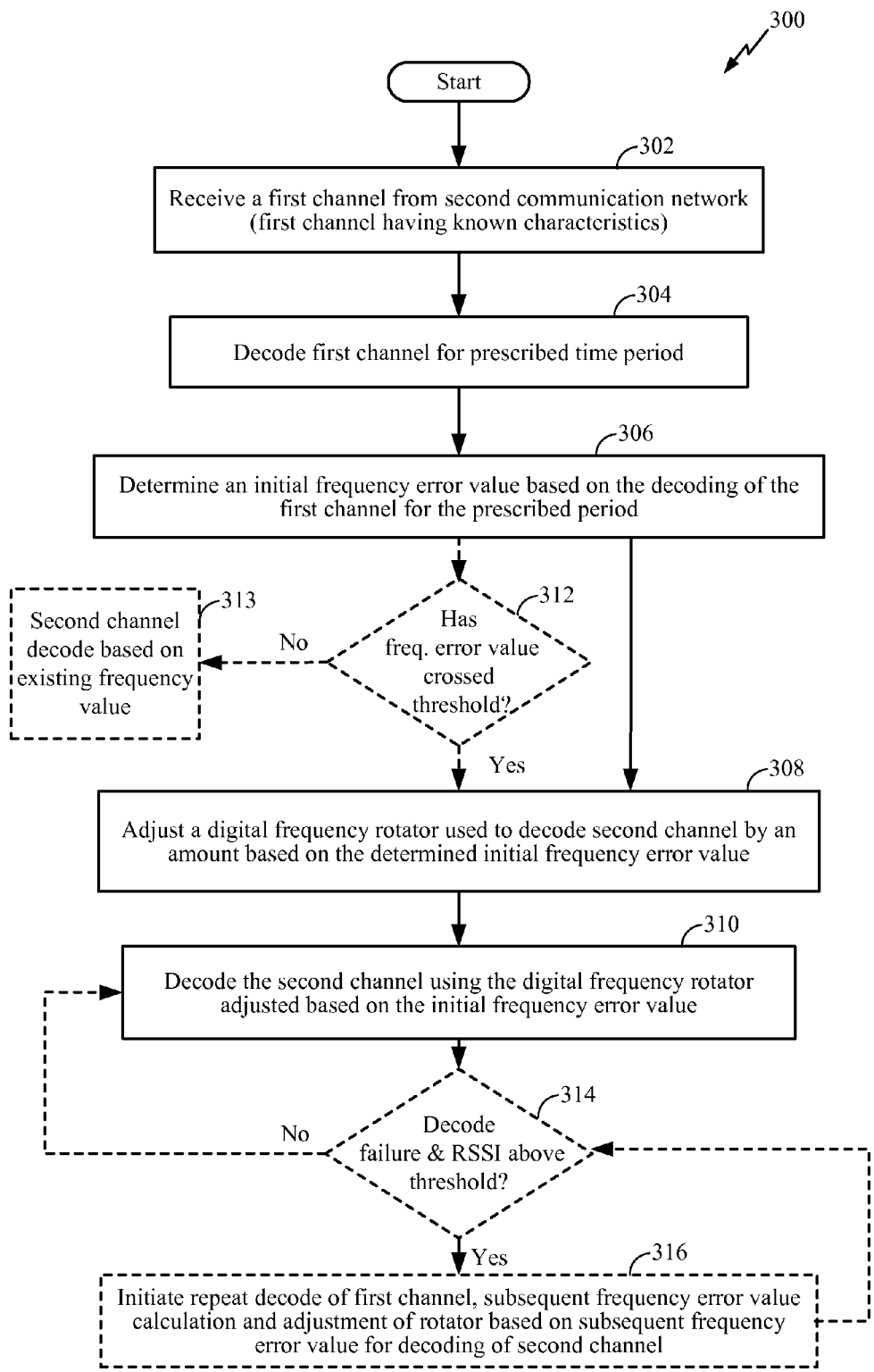
FIG. 3 illustrates a method for resolving frequency error in a mobile device transitioning from one network to another network.

FIG. 3 is a flow diagram of an exemplary method 300 for resolving frequency error in a mobile device transitioning from a first communication network to a second communication network. After initialization of the process 300, flow proceeds to block 302 where a first channel is received from a second communication network when the mobile device is in communication with the first communication network. It is noted that the first channel has known characteristics, which may be used to determine or calculate a frequency error. For example, where the second network is a GSM network, the first channel may be an FCCH channel having a burst of zero bits, from which frequency can be determined. The procedure of block 302 may be implemented by transceiver 202, as an example.

From block 302, flow proceeds to block 304 where the first channel is decoded for a prescribed time period. The time period is any suitable period sufficient to garner enough information to determine the frequency of the second network from the first channel. It is noted that the process of block 304 may include multiple decodes of the first channel over this prescribed time period to ensure an accurate estimate for calculating frequency error. The decoding in block 304 may be implemented by a decoder in conjunction with a demodulator, such as decoder 210 and demodulator 208 in FIG. 2. After decoding of the first channel, flow proceeds to block 306 where an initial frequency error value is determined or calculated based on the decoding of the first channel. Frequency error calculation unit 212, shown in FIG. 2, or any other suitable processor, may determine the initial frequency error value, for example.

After determination of the initial frequency error value, flow proceeds to block 308 where a digital frequency rotator is adjusted by an amount based on the determined initial frequency error value for purposes of then decoding the second channel. It is noted that according to an aspect, the frequency rotator adjust the frequency of the incoming signal by an amount equal to the calculated frequency error value. The process of block 308 may be implemented by the frequency error calculation unit 212 in conjunction with the digital frequency rotator 206, as illustrated in FIG. 2, as one example.

After block 308, flow proceeds to block 310 where the second channel is then decoded. In an example of a GSM system, the second channel is an SCH channel used for synchronization. It is noted that a demodulator and decoder, such as demodulator 208 and decoder 210 shown in FIG. 2, may also perform decoding of the second channel.

It is noted that further alternative processes may be added to the process of blocks 302 through 310 as also illustrated in FIG. 3 by blocks and arrows having dashed lines. In an alternative, after the process of block 306 is completed, flow may proceed to decision block 312 where a determination is made whether the initial frequency error value has crossed a threshold value (e.g., exceeded the value indicating a problematic error value that likely will result in decoding failures of the second channel). If the threshold has been crossed as determined in block 312, flow then proceeds to blocks 308 and 310 as discussed above. In the alternative at block 312, if the threshold is not exceeded, flow proceeds to block 313 where decoding of the second channel is performed based on an existing frequency value (and accordant setting of the digital rotator). Although not shown, the process of block 313 does not preclude repeat of the process 300 to again determine if a frequency error calculation yields a value exceeding the threshold at a later time. It is noted that the frequency calculation unit 212, as an example, or by any other suitable processor, may effect the process of block 312.

In another alternative, after the process of block 310, a further determination made be made whether a decode failure for decoding of the second channel has occurred as indicated in decision block 314. Such failure may indicate that the frequency offset of the rotator is no longer suitable due to frequency drift, but could also be indicative of lack of adequate coverage. Accordingly, the decision block 314 also determines whether an RSSI value has exceeded a threshold value, which indicates that the signal strength is adequate for proper decoding of received signals. Thus, the condition of block 314 is an AND function where both conditions must be met to return a "Yes" decision. If the condition of block 314 does return a "Yes" decision, flow proceeds to block 316. Otherwise, the process 300 loops back to block 310 for continued attempts to decode the second channel based on the initial frequency error value.

In block 316, a repeat decode of first channel is initiated in order to determine a subsequent frequency error value. Upon calculation of the subsequent frequency error value, adjustment of rotator based on this subsequent frequency error value is made. It is noted that in yet another alternative, which is not shown in FIG. 3, a condition similar to the condition of block 312 may be checked after the repeated decoding of the first channel and subsequent frequency error value calculation to determine if the frequency error value is great enough to necessitate rotation by the digital rotator. Furthermore, after the rotator has been adjusted based on the subsequently calculated frequency error value, the flow may loop back to block 314 to continuing monitoring for subsequent decode failures of the second channel. It is noted that one or more of the decoder 210, DSP 214, frequency error calculation unit 212, and any other suitable processor may implement the processes of block 316.

It is noted that determination of a frequency error estimation from the first channel prior to the second channel in each decoding instance as discussed in the background herein, does yield better tracking of the dynamic changes. As also explained previously, this methodology engenders a higher degree of complexity and will consume more power that the presently disclose methods and apparatus. That said, the present disclosure takes advantage of the observation that the large changes in the frequency error happen relatively infrequently. Thus, decoding the first channel and determining an initial frequency error for subsequent decodes of the second channel will, under predominate channel conditions, yield good decoding of the second channel with an attendant reduction in complexity and power consumption.

Figure 4:
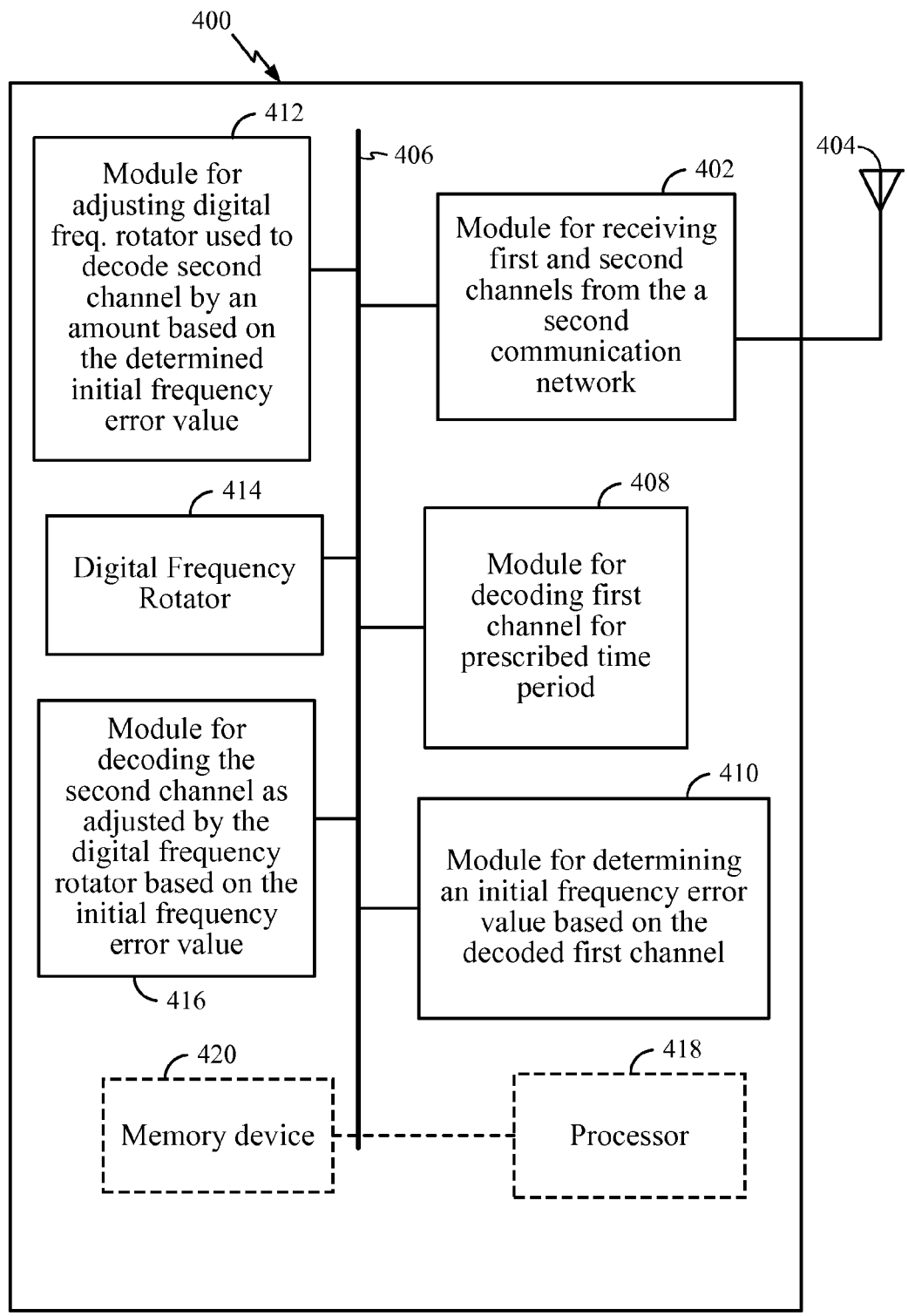
FIG. 4 illustrates a block diagram of another apparatus for resolving frequency errors arising in a mobile device when transitioning between two different networks.

FIG. 4 illustrates a block diagram of another apparatus 400 for resolving frequency errors arising in a mobile device when transitioning between two different networks, namely transitioning from a first network to a second network. It is noted that apparatus 400 may comprise a mobile device, similar to mobile device 200, or may also be comprised as a processor implementable within a mobile device.

As shown, the apparatus 400 includes a module 402 for receiving first and second channels from the second communication network, the first channel having at least one known characteristic. As explained previously, the known characteristic includes information allowing the apparatus to determine a frequency of the second network, such as an FCCH channel in a GSM network. The module 402 may be implemented by a transceiver, such as transceiver 202 in FIG. 2, in conjunction with a communicatively coupled antenna 404.

Module 402 output the received signals to a bus 406 or any similarly configured means for communicating information to other modules in apparatus 400. The first channel is communicated to a module 408 for decoding the first channel for prescribed time period. It is noted that, in an example, module 408 may be implemented by a demodulator and decoder, such as demodulator 208 and decoder 210 disclosed in FIG. 2. The decoded first channel information is then communicated to a module 410 for determining an initial frequency error value based on the decoded first channel. Frequency error calculation unit 212 in FIG. 2 or any suitable processor configurable to perform this function may implement module 410, for example.

Apparatus 400 also includes a module 412 for adjusting a digital frequency rotator 414. The module 412, which may also be implemented by frequency error calculation unit 212 in FIG. 2, or any suitable processor configurable to perform this function, adjusts rotator 414 by an amount based on the determined initial frequency error value. The rotator 414, similar to rotator 206, adjusts the incoming signal received by module 402 prior to decoding of the second channel. The second channel may be, for example, an SCH channel in the case of GSM, or any other similarly configured broadcast channel used for determining timing settings.

Furthermore, apparatus 400 includes a module 416 decoding the second channel as adjusted by the digital frequency rotator 414 based on the initial frequency error value. That is, the second channel signal from module 402 is applied to rotator 414 after module 412 has adjusted the frequency to resolve frequency error due to mismatched frequencies between the first and second communication systems. It is noted that module 416 may be implemented by demodulator 208, decoder 210, and transceiver 202, as an example.

Although not shown, one skilled in the art will appreciate that apparatus 400 may further employ additional modules for effecting the functions described above in connection with blocks 312, 314, and 316. Apparatus 400 may also include a processor 418 (shown optional as the apparatus may optionally be configured as a processor implementable in a mobile device instead of as the mobile device itself), such as a DSP, that is used to perform functions, such as further processing of the decoded second channel and determining when decoding of the second channel fails, triggering a recalculation of the frequency error correction value. Additionally, apparatus 400 may include an optional computer readable medium or memory device 420 configured to store computer readable instructions and data for effecting the processes and behavior of either the modules or processor (in the case of apparatus 400 configured as a mobile device) or the methods disclosed herein.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for resolving frequency errors in a wireless device transitioning from a first communication network to a second communication network, the method comprising:
   receiving a first channel from the second communication network, the first channel having at least one known characteristic;
   decoding the first channel for a prescribed period;
   determining an initial frequency error value based on the decoding of the first channel for the prescribed period;
   adjusting a digital frequency rotator used to decode a second channel received from the second communication network by an amount based on the determined initial frequency error value;
   continuously decoding the second channel using the digital frequency rotator adjusted based on the initial frequency error value;
   determining when a decoding failure of the second channel decoding occurs, and a received signal strength of the second channel crosses a predetermined signal strength threshold; and
   repeating decoding of the first channel for the prescribed period, determining a subsequent frequency error value, and adjusting the digital rotator based on the subsequent frequency error value when a decoding failure has occurred and the received signal strength has crossed the predetermined signal strength threshold;

wherein the first channel is a frequency correction channel (FCCH) and second channel is a synchronization channel.

2. The method of claim 1, further comprising:
determining if the initial frequency error value crosses a predetermined frequency error threshold prior to adjusting the digital frequency rotator and adjusting the digital frequency rotator when the frequency error value has crossed the predetermined frequency error threshold.

3. The method of claim 1, wherein the first communication system is a 3G communication system and the second communication system is a 2G communication system.

4. The method of claim 1, wherein the known characteristic includes information not communicating data and operable for determining a frequency.

5. A mobile device operable for communication in at least first and second communication networks, the device comprising:
a transceiver configured to receive a first channel from the second communication network, the first channel having at least one known characteristic;
a decoder configured to initially decode the first channel for a prescribed period;
a frequency error calculation unit configured to calculate an initial frequency error value based on the decoded first channel from the decoder;
a frequency rotator configured to receive the initial frequency error value calculated by the frequency error calculation unit and adjust the frequency of a second channel received by the transceiver by an amount based on the determined initial frequency error value for decoding of the second channel by the decoder, and
a processor configured to:
determine when a decoding failure of the second channel by the decoder occurs, and to determine when a received signal strength of the second channel crosses a predetermined signal strength threshold; and
initiate repeat decoding of the first channel by the decoder for the prescribed period, and determination of a subsequent frequency error value by the frequency error calculation unit to cause the digital rotator to rotate the based on the subsequent frequency error value when a decoding failure of the second channel has occurred and the received signal strength has crossed the predetermined signal strength threshold;
wherein the first channel is a frequency correction channel (FCCH) and second channel is a synchronization channel.

6. The mobile device of claim 5, wherein the frequency error calculation unit is further configured to determine if the initial frequency error value crosses a predetermined frequency error threshold prior to adjusting the digital frequency rotator, and to issue the frequency error value to the digital frequency rotator when the frequency error value has crossed the predetermined frequency error threshold.

7. The mobile device of claim 5, wherein the first communication system is 3G communication system and the second communication system is a 2G communication system.

8. The mobile device of claim 5, wherein the known characteristic includes information not communicating data and operable for determining a frequency.

9. An apparatus for resolving frequency errors in a wireless device transitioning from a first communication network to a second communication network comprising:

means for receiving a first channel from the second communication network, the first channel having at least one known characteristic;
means for decoding the first channel for a prescribed period;
means for determining an initial frequency error value based on the decoding of the first channel for the prescribed period;
means for adjusting a digital frequency rotator used to decode a second channel received from the second communication network by an amount based on the determined initial frequency error value; and
means for continuously decoding the second channel using the digital frequency rotator adjusted based on the initial frequency error value;
means for determining when a decoding failure of the second channel decoding occurs, and a received signal strength of the second channel crosses a predetermined signal strength threshold; and
means for repeating decoding of the first channel for the prescribed period, determining a subsequent frequency error value, and adjusting the digital rotator based on the subsequent frequency error value when a decoding failure has occurred and the received signal strength has crossed the predetermined signal strength threshold;
wherein the first channel is a frequency correction channel (FCH) and the second channel is a synchronization channel (SCH).

10. The apparatus of claim 9, further comprising:
means for determining if the initial frequency error value crosses a predetermined frequency error threshold prior to adjusting the digital frequency rotator and adjusting the digital frequency rotator when the frequency error value has crossed the predetermined frequency error threshold.

11. The apparatus of claim 9, wherein the first communication system is a 3G communication system and the second communication system is a 2G communication system.

12. The apparatus of claim 9, wherein the known characteristic includes information not communicating data and operable for determining a frequency.

13. A computer program product, comprising:
a computer-readable medium physically embodied with computer-readable program code for:
causing a computer to receive a first channel from a communication network, the first channel having at least one known characteristic;
causing a computer to decode the first channel for a prescribed period;
causing a computer to determine an initial frequency error value based on the decoding of the first channel for the prescribed period;
causing a computer to adjust a digital frequency rotator used to decode a second channel received from a communication network by an amount based on the determined initial frequency error value;
causing a computer to continuously decode the second channel using the digital frequency rotator adjusted based on the initial frequency error value;
causing a computer to determine when a decoding failure of the second channel decoding occurs, and a received signal strength of the second channel crosses a predetermined signal strength threshold; and
causing a computer to repeat decoding of the first channel for the prescribed period,
determine a subsequent frequency error value, and adjust the digital rotator based on the subsequent frequency error value when a decoding failure has occurred and the received signal strength has crossed the predetermined signal strength threshold;

wherein the first channel is a frequency correction channel (FCCH) and second channel is a synchronization channel (SCH).

14. The computer program product of claim 13, wherein the computer-readable medium further comprises code for:

causing a computer to determine if the initial frequency error value crosses a predetermined frequency error threshold prior to adjusting the digital frequency rotator and adjust the digital frequency rotator when the frequency error value has crossed the predetermined frequency error threshold.

15. The computer program product of claim 13, wherein the communication system is a 2G communication system.

16. The computer program product of claim 13, wherein the known characteristic includes information not communicating data and operable for determining a frequency.

17. A processor programmed to execute a method for resolving frequency errors in a wireless device transitioning from a first communication network to a second communication network, the method comprising:

decoding the first channel for a prescribed period;

determining an initial frequency error value based on the decoding of the first channel for the prescribed period;

adjusting a digital frequency rotator used to decode a second channel received from the second communication network by an amount based on the determined initial frequency error value;

continuously decoding the second channel using the digital frequency rotator adjusted based on the initial frequency error value;

determining when a decoding failure of the second channel decoding occurs, and a received signal strength of the second channel crosses a predetermined signal strength threshold; and repeating decoding of the first channel for the prescribed period, determining a subsequent frequency error value, and adjusting the digital rotator based on the subsequent frequency error value when a decoding failure has occurred and the received signal strength has crossed the predetermined signal strength threshold;

wherein the first channel is a frequency correction channel (FCCH) and second channel is a synchronization channel (SCH).

18. The processor of claim 17, wherein the method further comprises:

determining if the initial frequency error value crosses a predetermined frequency error threshold prior to adjusting the digital frequency rotator and adjusting the digital frequency rotator when the frequency error value has crossed the predetermined frequency error threshold.

19. The processor of claim 17, wherein the first communication system is a 3G communication system and the second communication system is a 2G communication system.

20. The processor of claim 17, wherein the known characteristic includes information not communicating data and operable for determining a frequency.

* * * * *